(12) United States Patent
Balaraman et al.

(10) Patent No.: US 11,928,386 B2
(45) Date of Patent: Mar. 12, 2024

(54) AUDIO PERIPHERAL DEVICE SELECTIONS

(71) Applicant: Hewlett-Packard Development Company, L.P., Spring, TX (US)

(72) Inventors: Srinath Balaraman, Spring, TX (US); Ling Wei Chung, Spring, TX (US); Pradosh Tulsidas Verlekar, Spring, TX (US); Charles J. Stancil, Spring, TX (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 73 days.

(21) Appl. No.: 17/297,116

(22) PCT Filed: Jul. 17, 2019

(86) PCT No.: PCT/US2019/042142
§ 371 (c)(1),
(2) Date: May 26, 2021

(87) PCT Pub. No.: WO2021/010993
PCT Pub. Date: Jan. 21, 2021

(65) Prior Publication Data
US 2022/0342629 A1    Oct. 27, 2022

(51) Int. Cl.
*G06F 3/16*    (2006.01)
*H04L 67/52*    (2022.01)

(52) U.S. Cl.
CPC .............. *G06F 3/165* (2013.01); *H04L 67/52* (2022.05)

(58) Field of Classification Search
CPC ...... G06F 3/165; G06F 9/4413; G06F 9/4451; H04L 67/52
See application file for complete search history.

(56) References Cited

U.S. PATENT DOCUMENTS

| | | |
|---|---|---|
| 8,260,999 B2 | 9/2012 | Ganesh et al. |
| 8,527,688 B2 | 9/2013 | Chatterjee et al. |
| 8,554,045 B2 | 10/2013 | Brooking et al. |
| 8,613,385 B1 | 12/2013 | Hulet et al. |
| 8,914,559 B2 * | 12/2014 | Kalayjian ............. H04W 4/029 710/36 |
| 9,081,746 B1 * | 7/2015 | Helter .................. G06F 15/177 |
| 9,207,713 B1 | 12/2015 | Waide |
| 10,080,089 B2 | 9/2018 | Mayman et al. |
| 2010/0185787 A1 * | 7/2010 | Krantz ............. H04N 21/42203 710/19 |
| 2012/0054613 A1 * | 3/2012 | Yoo ....................... H04M 1/724 715/716 |

(Continued)

*Primary Examiner* — Abdullahi E Salad
(74) *Attorney, Agent, or Firm* — Knobbe, Martens, Olson & Bear, LLP

(57) ABSTRACT

An example computing device includes a plurality of interfaces to connect to a plurality of audio peripheral devices, a communications interface to establish a network connection, and a processor interconnected with the plurality of interfaces and the communications interface. The processor is to determine a location of the computing device based on the network connection. The processor sets an audio peripheral device from the plurality of the audio peripheral devices as a default audio peripheral device based on the location. The processor communicates an audio signal through the default audio peripheral device.

13 Claims, 3 Drawing Sheets

(56) References Cited

U.S. PATENT DOCUMENTS

| | | | |
|---|---|---|---|
| 2014/0096092 A1* | 4/2014 | Johnson | G06F 3/04842 |
| | | | 715/863 |
| 2014/0337492 A1* | 11/2014 | Dubs | H04L 41/0816 |
| | | | 709/221 |
| 2016/0057526 A1* | 2/2016 | Jaffe | G10L 21/0208 |
| | | | 381/74 |
| 2016/0254954 A1 | 9/2016 | King et al. | |
| 2016/0342779 A1* | 11/2016 | Johnson | G06F 21/31 |
| 2017/0308121 A1 | 10/2017 | Vroom et al. | |
| 2020/0288247 A1* | 9/2020 | Reily | H04R 29/001 |

* cited by examiner

AUDIO PERIPHERAL DEVICE SELECTIONS

BACKGROUND

Computing devices may be connected to audio peripheral devices, such as headsets, microphones, speakers, and other devices for communicating audio signals. The computing device communicate audio signals through the audio peripheral devices to play movies, music, voice calls, and other audio media.

DETAILED DESCRIPTION

Computing devices, such as personal computers, laptops, desktops, or other types of computing devices such as imaging devices and the like, may be connected to audio peripheral devices for communicating audio signals, such as movies, music, voice calls, and other audio media. Such computing devices often operate on a "set and forget" methodology, whereby audio peripheral devices are set for a session, and forgotten upon completion of the session. User preferences are not maintained from session to session.

Some docking stations may be employed to cooperate with computing devices to implement user preferences. For example, some docking stations may store the user preferences and provide the user preferences to the computing device when the computing device is docked at the given docking station. Other docking stations may provide an identifying key to the computing device to enable the computing device to determine what user preferences to implement. However, in both examples, the computing device is docked at the docking station in order to implement the user preferences.

A computing device may store an association between a location of the computing device and a default audio peripheral device to use in that location. The computing device determines the location based on a network connection. For example, the computing device may associate network identifying characteristics, such as a type of connection, a network identifier, and an access point identifier with a location. The computing device may thus set the default audio peripheral device based on user preferences on a home network, on a work network, on a public network, or the like, and communicate an audio signal through the default audio peripheral device.

The computing device may further set the default audio peripheral device based on calendar data, schedule data associated with a user account, or other parameters. The computing device may store historical data including the parameters, the default audio peripheral device, and usage data for the audio peripheral device for each session. The historical data may be used by the computing device to generate a predicted default audio peripheral device after a threshold number of selections. The predicted default audio peripheral device may be generated by implementing a neural network system trained based on the historical data. The computing device may also receive, from a user, a selection of a further audio peripheral device different from the default audio peripheral device and communicate the audio signal through the further audio peripheral device. The selection of the further audio peripheral device may be stored in the historical data to provide further verification or feedback for future predicted default audio peripheral devices.

Figure 1:
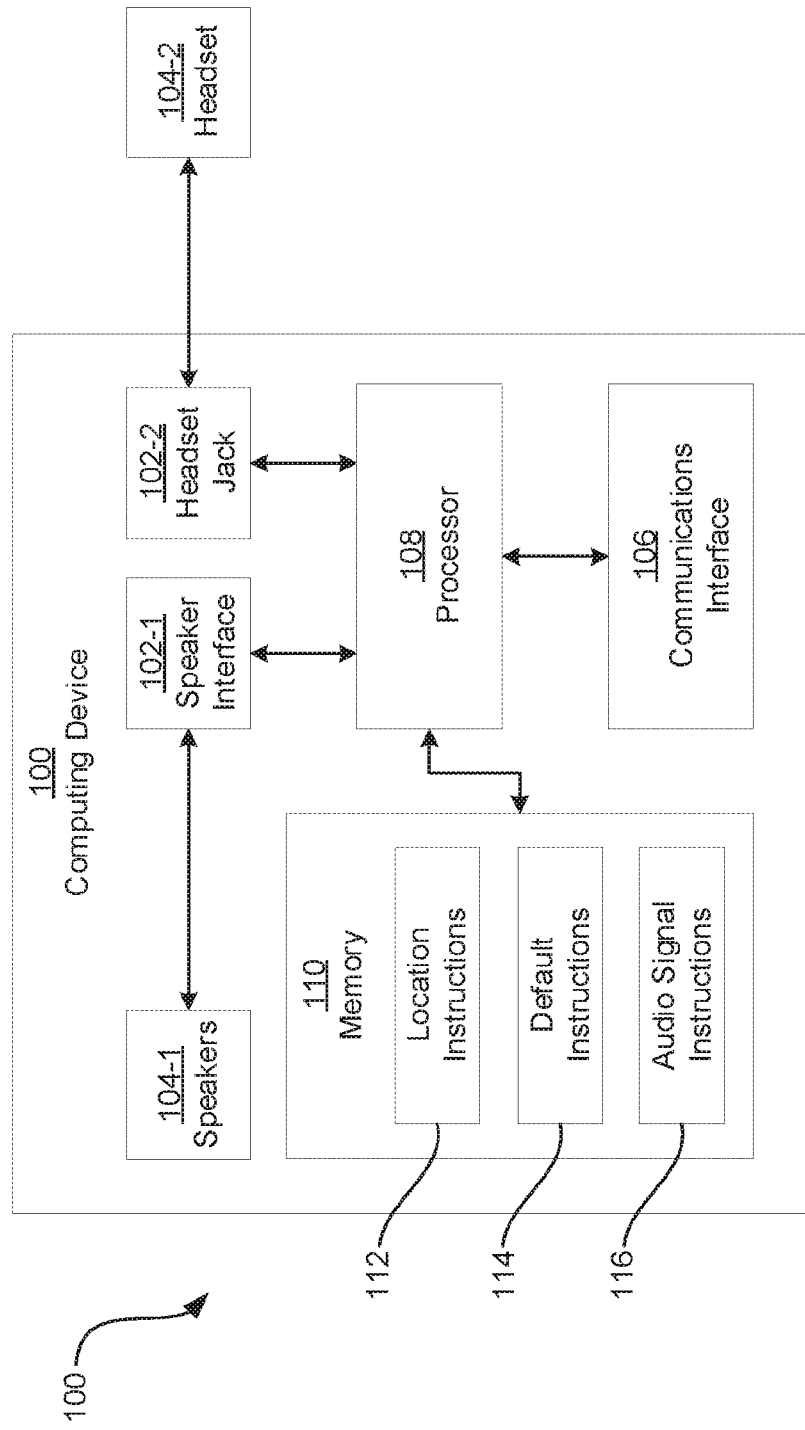
FIG. 1 is a block diagram of an example computing device for audio peripheral device selection.

FIG. 1 shows a block diagram of an example computing device 100, such as a laptop or a notebook computer. The computing device 100 includes a plurality of interfaces 102-1 and 102-2 (referred to herein collectively as interfaces 102 and generically as an interface 102), a communications interface 106, a processor 108, and a memory 110.

The plurality of interfaces 102 are to connect to a plurality of audio peripheral devices, such as speakers 104-1 and a headset 104-2 (also referred to generically as audio peripheral devices 104). The interfaces 102 may include internal interfaces, such as a speaker interface 102-1 to connect to the speakers 104-1 integrally formed with the computing device 100. In other examples, the interfaces 102 may include externally facing interfaces to connect to separate audio peripheral devices. For example, a headset jack 102-2 may connect to the headset 104-2. In other examples, other externally facing interfaces such as USB ports, or other types of ports may be used to connect to other external audio peripheral devices 104, such as speakers or the like. In some examples, the external audio peripheral devices may be connected via a docking station or other suitable intermediary device.

The communications interface 106 is to establish a network connection for the computing device 100. The communications interface 106 includes suitable hardware (e.g. transmitters, receivers, network interface controllers and the like) allowing the computing device 100 to establish a network connection and communicate with other computing devices. Specifically, the communications interface 106 may communicate with an access point and may cooperate with the access point to determine a network identifier, an access point identifier, or other suitable network identifying characteristics for determining a location of the computing device 100.

The processor 108 is interconnected with the plurality of interfaces 102 and the communications interface 106. The processor 108 may include a central processing unit (CPU), a microcontroller, a microprocessor, a processing core, a field-programmable gate array (FPGA), or similar device capable of executing machine-readable instructions. The processor 108 may cooperate with a memory 110 to execute instructions. Memory may include a non-transitory machine-readable storage medium that may be may electronic, magnetic, optical, or other physical storage device that stores executable instructions. The machine-readable storage medium may include, for example, random access memory (RAM), read-only memory (ROM), electrically-erasable programmable read-only memory (EEPROM), flash memory, a storage drive, an optical disc, and the like. The machine-readable storage medium may be encoded with executable instructions.

In particular, the memory 110 includes location instructions 112, which, when executed, cause the processor 108 to determine the location of the computing device 100 based on the network connection. Specifically, the processor 108 may determine the location based on the network identifier, the access point identifier, or other suitable network identifying characteristic determined by the communications interface 106.

The memory 110 further includes default instructions 114, which, when executed, cause the processor 108 to set an audio peripheral device 104 from the plurality of audio peripheral devices 104 as a default audio peripheral device based on the location of the computing device 100. For example, the processor 108 may select the headset 104-2 as the default audio peripheral device when the computing device 100 is at one location, and the speakers 104-1 as the default audio peripheral device when the computing device 100 is at a different location.

The memory 110 further includes audio signal instructions 116, which, when executed, cause the processor 108 to communicate an audio signal through the default audio peripheral device.

The memory 110 may further include repositories storing data for use during the execution of the location instructions 112, the default instructions 114, and the audio signal instructions 116. For example, the memory 110 may store location data and historical data. The location data may include a location identifier, network characteristics identified by the communications interface 106 (e.g. a type of network connection, a network identifier, an access point identifier, and the like), and a count of network connections at that location. In some examples, the location data may be stored integrally with historical data including an association between a given location and the selected default audio peripheral device. The historical data may further include other parameters of use of the default audio peripheral device, such as a length of use of the default audio peripheral device, the type of audio content (e.g. movies, music, voice, or other audio media) communicated through the default audio peripheral device, and the like. In particular, the historical data may track a change in the audio peripheral device during a session. For example, the session may be initiated with audio signals communicated through the default audio peripheral device and may change partway through the session to have audio signals communicated through a further audio peripheral device, as is described further herein. Additionally, the count of the network connections at a given location may represent a number of selections of the default audio peripheral device at the given location.

In some examples, the memory 110 may further store default audio peripheral device data storing an association between a location, other parameters for selecting a default audio peripheral device, and the predicted default audio peripheral device for that combination of location and parameters.

Figure 2:
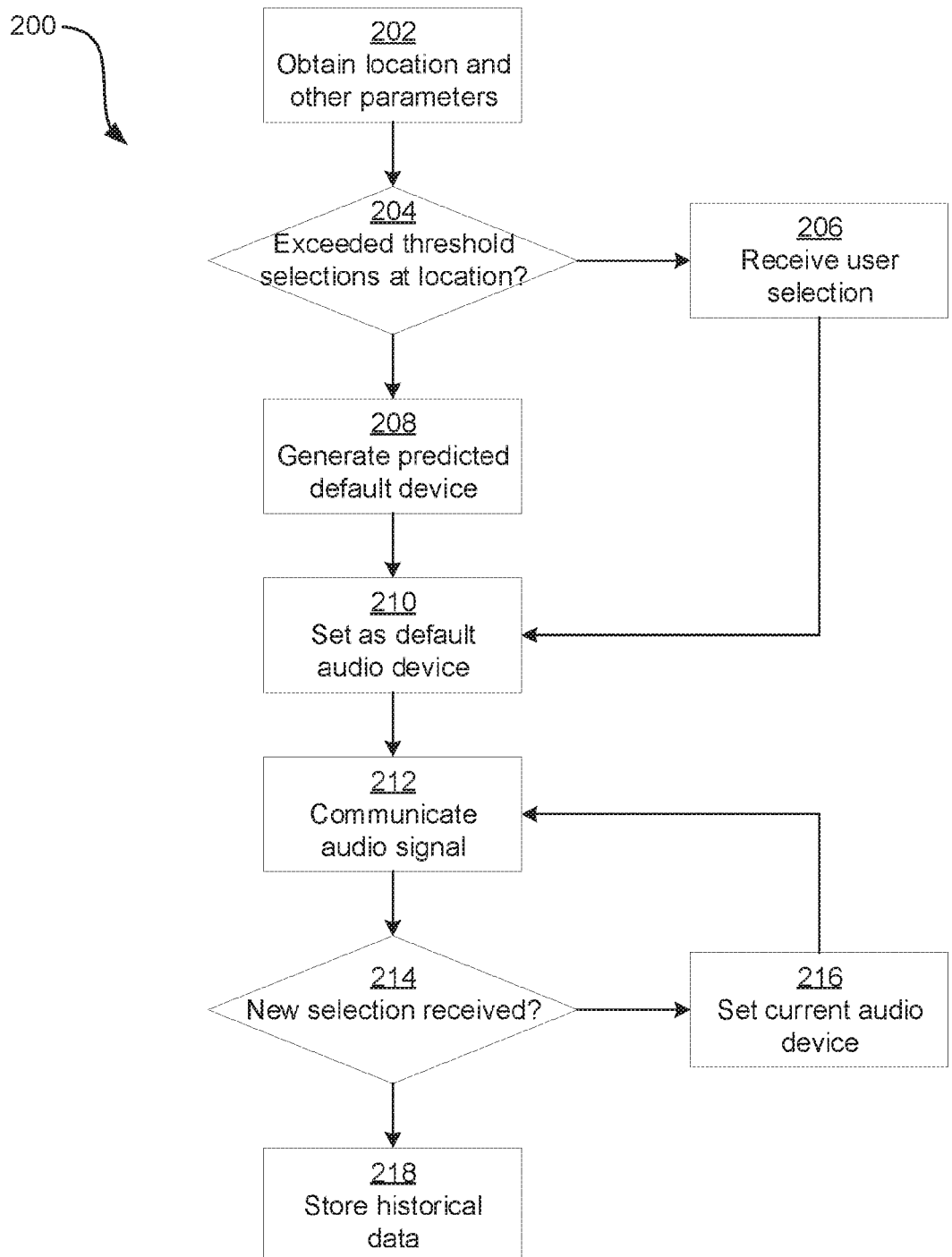
FIG. 2 is a flowchart of an example method for audio peripheral device selection.

FIG. 2 depicts a flowchart of an example method 200 of setting a default audio peripheral device for communicating audio signals. The method 200 is described in conjunction with its performance by the computing device 100, and in particular, the processor 108. In other examples, the method 200 may be performed by other suitable devices or systems.

The method 200 is initiated at block 202. The method 200 may be initiated, for example, upon initialization of the computing device 100. In other examples, the method 200 may be initiated in response to a request to communicate an audio signal. For example, a user of the computing device 100 may initiate a call or play audio or video media.

At block 202, the processor 108 determines a location of the computing device 100 based on the network connection established by the communications interface 106. Specifically, the processor 108 may determine the location based on characteristics of the network, such as the type of connection to the network (e.g. wired or wireless), a network identifier, and an access point identifier (e.g. an IP address or the like).

Figure 3A:
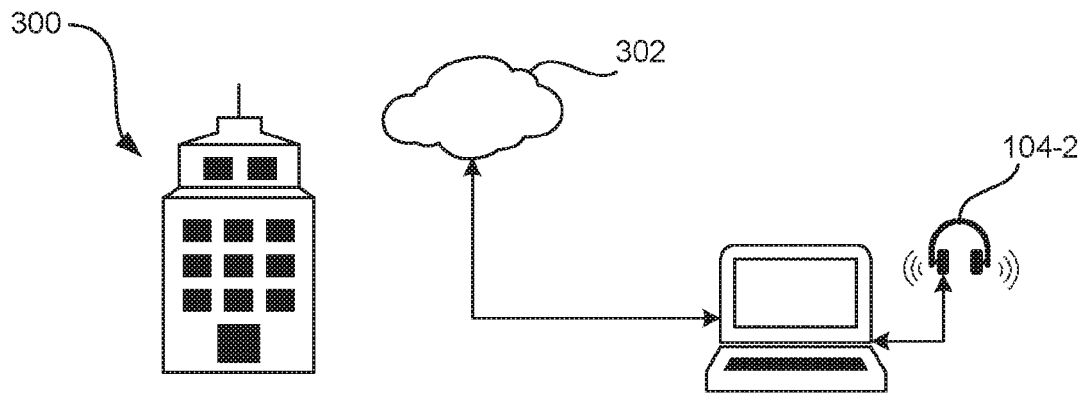
FIG. 3A is a schematic diagram of an example computing device for audio peripheral device selection in a workplace environment.

For example, referring to FIG. 3A, the computing device 100 is located in a workplace environment 300, and the communications interface 106 may establish a network connection via a wired link to a workplace network 302. The processor 108 may obtain, from the communications interface 106, the type of connection to the network (i.e. wired) and a network identifier of the workplace network 302 to determine that the computing device 100 is located at the workplace environment 300.

Figure 3B:
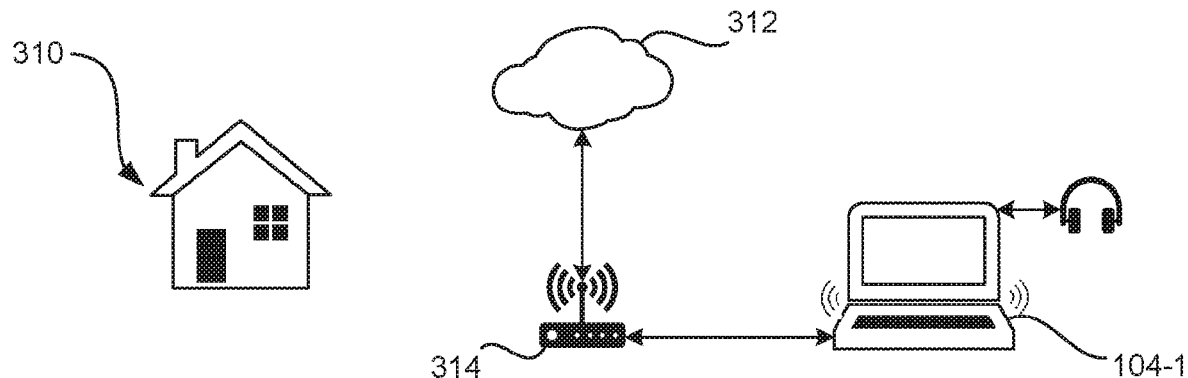
FIG. 3B is a schematic diagram of another example computing device for audio peripheral device selection at home.

In another example, referring to FIG. 3B, the computing device 100 is located in a home environment 310, and the communications interface 106 may establish a network connection to a home network 312 via an access point 314 (e.g. a router or the like). The processor 108 may obtain, from the communications interface 106, the type of connection to the network (i.e. wireless), a network identifier of the home network 312, and an access point identifier of the access point 314 to determine that the computing device 100 is located at the home environment 310.

Figure 3C:
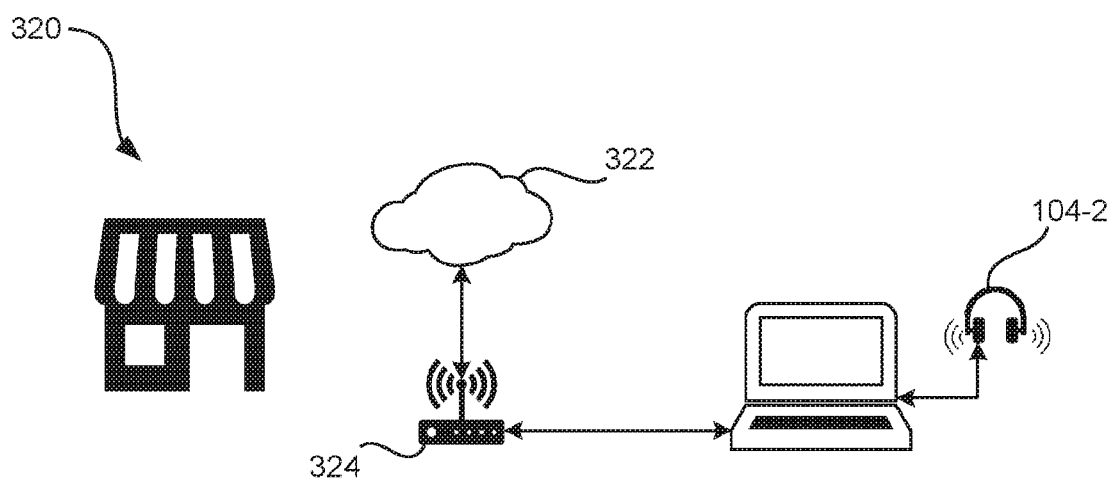
FIG. 3C is a schematic diagram of another example computing device for audio peripheral device selection in a public environment.

In a further example, referring to FIG. 3C, the computing device 100 is located in a public environment 320 (e.g. in a coffee shop or other public location), and the communications interface 106 may establish a network connection to a public network 322 via an access point 324 (e.g. a public router or the like). The processor 108 may obtain, from the communications interface 106, the type of connection to the network (i.e. wireless), a network identifier of the public network 322, and an access point identifier of the access point 324 to determine that the computing device 100 is located at the public environment 320.

Returning to FIG. 2, at block 202, the processor 108 may also obtain further parameters for setting the default audio peripheral device. For example, the processor 108 may obtain calendar data, such as a date and time, as determined by native clock and calendar applications. The processor 108 may also obtain schedule data associated with a user account. For example, a user of the computing device 100 may have an email account associated with the computing device 100. The email account may include scheduled events (e.g. meetings, conference calls, or the like) including an event date and time, as well as event location data (e.g. an address, a meeting room, a conference call line, or the like). Accordingly, the schedule data obtained by the processor 108 may include said event location data, as well as the event date and time.

At block 204, the processor 108 may determine whether a threshold number of selections at the determined location have occurred. For example, the processor 108 may utilize the historical data from the selection of the default audio peripheral device at a given location to generate a predicted default audio peripheral device. Accordingly, the threshold may be defined according to a minimum number of selections at the given location to generate a prediction based on the historical data at the given location. In another example, the threshold number of selections may be set across all locations. That is, the processor 108 may evaluate the selections of the default audio peripheral device at all locations to generate a predicted default audio peripheral device at the given location.

If the threshold number of selections at the determined location have not occurred, the processor 108 proceeds to block 206. At block 206, the processor 108 receives input from a user of the computing device 100 as to the default audio peripheral device. For example, the processor 108 may present, at a display of the computing device 100, a user interface for selecting a default audio peripheral device from the audio peripheral devices 104 connected to an interface 102 of the computing device 100. Upon receiving a selection from a user, the processor 108 proceeds to block 210.

If, at block 204, the threshold number of selections have occurred, the processor 108 proceeds to block 208. At block 208, the processor 108 generates a predicted default audio peripheral device based on the location determined at block 202. In particular, the processor 108 may detect the audio peripheral devices 104 connected to an interface 102 of the computing device 100 which are available for selection. In some examples, the processor 108 may further consider the other parameters obtained at block 202 in generating the predicted default audio peripheral device.

For example, referring again to FIG. 3A, the computing device 100 is located in the workplace environment 300. In practice, a user of the computing device 100 may generally select, as the default audio peripheral device, the headset 104-2 in order to avoid disturbing his or her neighbors. Accordingly, after the threshold number of selections, the processor 108 may generate, as the predicted default audio peripheral device, the headset 104-2.

In other examples, the user of the computing device 100 may select, as the default audio peripheral device, the speakers 104-1, after 6 pm, or on weekends, as there may be fewer or no neighbors to disturb. Accordingly, the processor 108 may additionally consider the calendar data in generating the predicted default audio peripheral device.

In still further examples, the user may select, as the default audio peripheral device, a wirelessly connected speaker (not shown) available for connection in an office meeting room. That is, when the user is in a meeting in the office meeting room, the default audio peripheral device may be selected as the wirelessly connected speaker. Accordingly, the processor 108 may additionally consider the schedule data, and in particular, the event location data, in generating the predicted default audio peripheral device.

Referring to FIG. 3B, the computing device 100 is located in the home environment 310. In practice, the user of the computing device 100 may generally select, as the default audio peripheral device, the speakers 104-1 as the user may not be concerned about disturbing neighbors and hence may play audio media more freely. Accordingly, after the threshold number of selections, the processor 108 may generate, as the predicted default audio peripheral device, the speakers 104-1.

In other examples, the user of the computing device 100 may select, as the default audio peripheral device, the headset 104-2, after 9 pm in order to avoid disturbing sleeping family members. Accordingly, the processor 108 may additionally consider the calendar data in generating the predicted default audio peripheral device.

Referring to FIG. 3C, the computing device 100 is located in a public environment 320. The user of the computing device 100 may generally select, as the default audio peripheral device, the headset 104-2 in order to maintain privacy. Accordingly, after the threshold number of selections, the processor 108 may generate, as the predicted default audio peripheral device, the headset 104-2.

The processor 108 may generate the predicted default audio peripheral device based on a deterministic model. That is, the memory 110 may store a repository tracking the default audio peripheral device based on the determined location and any other parameters obtained at block 202.

Accordingly, the processor 108 may perform a lookup in the repository to generate the predicted default audio peripheral device.

In other examples, the processor 108 may implement neural network systems or machine learning algorithms to generate the predicted default audio peripheral device. That is, the processor 108 may receive, as input, the determined location and any other parameters obtained at block 202 and output the predicted default audio peripheral device. In particular, the processor 108 may use the historical data to train the neural networks and/or machine learning algorithms to allow each instance of selecting a default audio peripheral device to provide corrective feedback or verification. For example, the processor 108 may continue to learn and be updated based on user selection of a further audio peripheral device (e.g. to correct the predicted default audio peripheral device or to indicate different parameters for selecting the further audio peripheral device). Additionally, the processor 108 may verify the predicted default audio peripheral device if no further audio peripheral device is selected.

In other examples, the processor 108 may use the historical data to generate a predicted default audio peripheral device at locations with no previous selections. For example, in practice, the user of the computing device 100 may generally select the headset 104-2 as the default audio peripheral device when in public environments. Additionally, the computing device 100 may connect to a variety of different networks in public environments. Accordingly, when the determined location has no previous selections, the processor 108 may generate, as the predicted default audio peripheral device, the headset 104-2.

At block 210, the processor 108 sets the default audio peripheral device. In particular, the processor 108 sets, as the default audio peripheral device, either the predicted default audio peripheral device generated at block 208, or the default audio peripheral device as selected by the user at block 206. In some examples, the processor 108 may present, at a display of the computing device 100, an indication of the selected default audio peripheral device.

At block 212, the processor 108 communicates an audio signal through the default audio peripheral device.

At block 214, the processor 108 may receive a selection of a further audio peripheral device from a user of the computing device 100, where the further audio peripheral device is different from the default audio peripheral device. If, at block 214, such a selection is received, the processor 108 proceeds to block 216 to set a current audio peripheral device based on the selection of the further audio peripheral device. The processor 108 then proceeds to block 212 to communicate the audio signal through the current audio peripheral device. That is, the audio signal may thus be communicated through the selected further audio peripheral device rather than the default audio peripheral device set at block 210.

In practice, the user of the computing device 100 may select a further audio peripheral device if the generated predicted default audio peripheral device is incorrect. For example, the first instance of initialization of the method during a different time frame (e.g. after work hours) may generate a predicted default audio peripheral device of the headset 104-2, however, the user of the computing device 100 may decide to select the speakers 104-1 as the current audio peripheral device. In particular, the processor 108 may present, at the display of the computing device 100, a user interface to select a further audio peripheral device. For example, the user interface may indicate audio peripheral devices 104 connected to an interface 102 of the computing device 100 which are available for selection. In particular, the user interface may be presented together with the indication of the default audio peripheral device. In other examples, based on changing parameters or uses of the computing device. For example, the user in the workplace environment 300 may notice that his or her neighbors have left for the evening and may switch from the headset 104-2 as the default audio peripheral device to the speakers 104-1 as the current audio peripheral device.

At block 218, the processor 108 stores the data pertaining to the session as historical data. For example, the processor 108 may store the location, including the location data (e.g. network identifiers and the like), calendar data, schedule data, parameters of use of the audio peripheral device, the predicted default audio peripheral device, and any further audio peripheral devices.

As described above, a computing device may determine a location of the computing device based on a network connection, set a default audio peripheral device based on the location, and communicate an audio signal through the default audio peripheral device. The computing device may further set the default audio peripheral device based on calendar data, schedule data associated with a user account, historical data, and other parameters. The computing device may use the historical data to generate a predicted audio peripheral device, for example, using a neural network system. The computing device may also receive a selection from a user to provide verification and feedback to the neural network system for future predicted default audio peripheral devices.

The scope of the claims should not be limited by the above examples, but should be given the broadest interpretation consistent with the description as a whole.

The invention claimed is:

1. A computing device comprising:
a plurality of interfaces to connect to a plurality of audio peripheral devices;
a communications interface to establish a network connection;
a memory to store historical data including an association between the network connection and a default audio peripheral device; and
a processor interconnected with the plurality of interfaces and the communications interface, the processor to:
generate a predicted default audio peripheral device from the plurality of the audio peripheral devices after a threshold number of selections at a historical network connection;
determine an audio peripheral device from the plurality of audio peripheral devices based on the historical data;
set the audio peripheral device from the plurality of the audio peripheral devices as a default audio peripheral device; and
communicate an audio signal through the default audio peripheral device.

2. The computing device of claim 1, wherein the processor is to:
determine calendar data; and
further set the default audio peripheral device based on the calendar data.

3. The computing device of claim 1, wherein the processor is to:
determine schedule data associated with a user account of the computing device; and
further set the default audio peripheral device based on the schedule data.

4. The computing device of claim 1, wherein the processor is to generate a predicted default audio peripheral device with a neural network system trained based on the historical data.

5. The computing device of claim 1, wherein the processor is to:
receive a selection of a further audio peripheral device from the plurality of the audio peripheral devices from a user; and
communicate the audio signal through the further audio peripheral device.

6. The computing device of claim 1, wherein the processor is to determine the audio peripheral device in response to a request to communicate the audio signal.

7. A non-transitory machine-readable storage medium storing a plurality of machine-readable instructions when executed cause a processor of a computing device to:
determine an audio peripheral device from a plurality of audio peripheral devices based on a network connection and stored historical data including a list of associations between historical network connections and historical audio peripheral devices;
generate a predicted default audio peripheral device from the plurality of audio peripheral devices after a threshold number of selections at the network connection;
set the audio peripheral device from a plurality of audio peripheral devices as a default audio peripheral device; and
communicate an audio signal through the default audio peripheral device.

8. The non-transitory machine-readable storage medium of claim 7, wherein further execution of the instructions is to:
determine calendar data; and
further set the default audio peripheral device based on the calendar data.

9. The non-transitory machine-readable storage medium of claim 7, wherein further execution of the instructions is to:
determine schedule data associated with a user account of the computing device; and
further set the default audio peripheral device based on the schedule data.

10. The non-transitory machine-readable storage medium of claim 7, wherein further execution of the instructions is to generate a predicted default audio peripheral device with a neural network system trained based on the historical data including the association between the network connection and the default audio peripheral device.

11. A computing device comprising:
a plurality of interfaces to connect to a plurality of audio peripheral devices;
a communications interface to establish a connection to a network;
a memory to store historical data including a list of associations between historical network connections and historical audio peripheral devices; and
a processor interconnected with the plurality of interfaces and the communications interface, the processor to:
generate a predicted default audio peripheral device from the plurality of audio peripheral devices after a threshold number of selections at the network connection;
obtain, from the communications interface, network identifying characteristics of the network;
set an audio peripheral device from the plurality of the audio peripheral devices as a default audio peripheral device based on the network identifying characteristics and the historical data; and communicate an audio signal through the default audio peripheral device.

12. The computing device of claim 11, wherein the processor is to generate a predicted default audio peripheral device with a neural network system trained based on the historical data.

13. The computing device of claim 11, wherein the processor is to set the default audio peripheral device in response to a request to communicate the audio signal.

* * * * *